HIGH TEMPERATURE FURNACE

Filed Sept. 30, 1964

Inventors.
Herbert W. Westeren
William G. Sefton
Vincent Scotto
By Sultu + Michaelson
Attorneys United States Patent Office 3,343,518
Patented Sept. 26, 1967

3,343,518
HIGH TEMPERATURE FURNACE

Herbert W. Westeren, Barrington, Vincent Scotto, Warwick, and William G. Sefton, Coventry, R.I., assignors to C. I. Hayes, Inc., Cranston, R.I., a corporation of Rhode Island Filed Sept. 30, 1964, Ser. No. 400,452
2 Claims. (Cl. 118—49.5)

ABSTRACT OF THE DISCLOSURE

A high temperature furnace having an elongated quartz conductor tube projecting through the heating chamber thereof and in which semi-conductor wafers to be processed are placed, and a heat storage tube surrounding the portion of the conductor tube in which the wafers are placed and providing for a uniform level of temperature therein.

The present invention relates to a high temperature furnace. More particularly, the present invention relates to a high temperature furnace that employs the diffusion process in the manufacture of semiconductor elements.

The furnace embodied in the present invention is adapted to be operated at high temperature levels in the range of 1300° C. One of the requirements for the furnace is that it maintains a uniformity of heat within a heating zone to a very precise degree. Normally complicated and expensive controls would be required to maintain the temperature at the required level without any appreciable change during the heating cycle. However the present invention incorporates a unique heat storage tube that has high thermal conductivity characteristics and is not only able to rapidly reach the required temperature level, but will remain at this level even though a work load to be heat treated is introduced therein. Because the furnace embodied herein has the unusual characteristic of being able to retain a high temperature without appreciable change during the heating cycle, the furnace has particular application in the manufacture of semi-conductors using the diffusion process. In this method as employed with the furnace herein, semiconductor wafers are placed in contact with a gas containing desired impurities and are heated to a required temperature. Gradual movement of the impurity atoms through the semi-conductor lattice, while the semi-conductor remains a solid, produces the desired diffusion entirely within the semi-conductor body. The semi-conductor body is thus grown with abrupt changes in the impurity concentration therein.

In order to process the semi-conductors as just described, the furnace embodied in the present invention includes a housing in which a heating chamber is located. An elongated quartz conductor tube projects through the heating chamber and semi-conductor wafers to be processed are placed within the conductor tube. A heat storage tube surrounds the portion of the conductor tube in which the wafers are located and provides for a uniform level of temperature for the wafers located in the conductor tube. The heat storage is heated to a predetermined temperature by heating elements that extend into the heating chamber and that are located in spaced relation with respect to the heat storage tube. The elongated conductor tube also extends exteriorly of the housing into a heating unit and carries therein a source of impurities. A stream of gas is passed through the conductor tube and since the source of impurities is subjected to a predetermined temperature in the heating unit, vaporized impurities from the source are produced that are carried by the conductor tube into the heating chamber for contact with the wafers located in the portion of the conductor tube that is enveloped by the heat storage tube. The wafers are thus subjected to the impurities and the concentration of the impurities for movement into the wafers is controlled accordingly.

Because of the unique characteristics of the heat storage tube, the temperature therein is maintained at a constantly high level and without any appreciable change even though a work load is introduced therein. Moreover no exceptional controls are required to maintain the high temperature level, and the area within the heat storage tube will be unifromly heated for producing the required temperature during the heating cycle.

Accordingly, it is an object of the present invention to provide a high temperature furnace in which a concentrated heating area is maintained at a high temperature level without the use of special controls.

Another object of the present invention is to provide a high temperature furnace that is utilized in the manufacture of semi-conductor elements.

Another object of the invention is to provide a high temperature furnace wherein a conductor tube is provided that extends through the heating chamber of the furnace and is enveloped by a heat storage tube that provides for a uniform and concentrated heated area within the conductor tube.

Still another object is to provide a high temperature furnace through which a conductor tube extends for conducting a gaseous medium therein, the gaseous medium being preheated in a heating unit located adjacent to the heating chamber of the furnace prior to the introduction therein.

Still another object is to provide a heat storage tube for a high temperature furnace that is formed of a material having a high thermal conductivity, wherein a predetermined temperature level is reached and maintained within fine tolerances without the requirement of special controls.

Other objects, features and advantages of the invention will become apparent as the description thereof proceeds when considered in connection with the accompanying illustrative drawings.

In the drawings which illustrate the best mode presently contemplated for carrying out the instant invention:

Figures 1, 2, 3, 4:
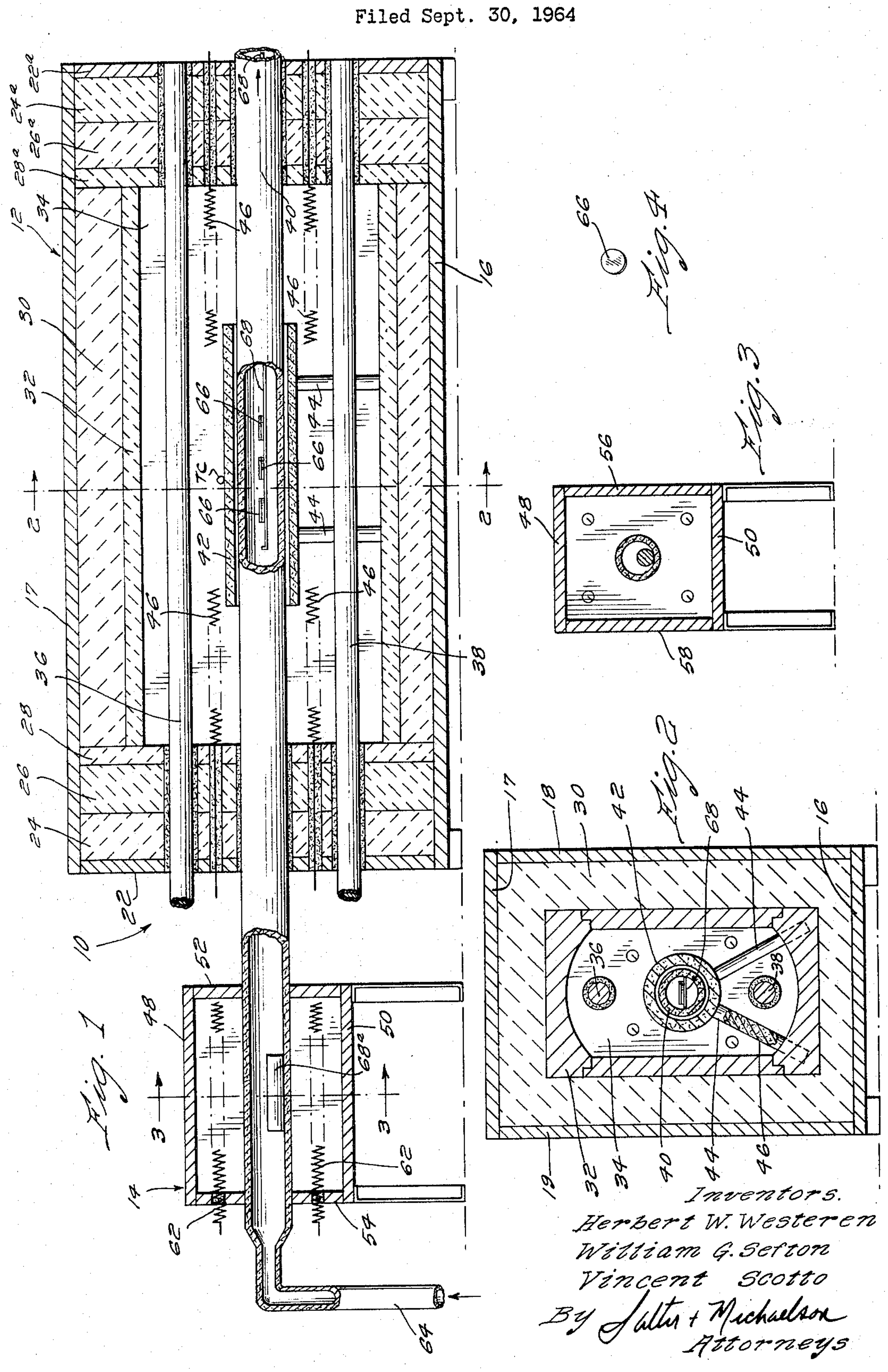
FIG. 1 is a vertical sectional view of the diffusion furnace embodied in the present invention.
FIG. 2 is a sectional view taken along lines 2—2 in FIG. 1.
FIG. 3 is a sectional view taken along lines 3—3 in FIG. 1.
FIG. 4 is an illustration of a semi-conductor wafer that is adapted to be treated in the diffusion furnace of the present invention.

Referring now to the drawing and particularly to FIG. 1, the furnace embodided in the present invention is illustrated therein and is generally indicated at 10. The furnace 10 includes a housing generally indicated at 12 and a heating unit generally indicated at 14 that is located externally of and adjacent to the housing 12. The housing 12 is defined by a bottom wall 16, a top 17, side walls 18 and 19 and end walls 22 and 22*a*. Located adjacent to the end walls 22 and 22*a* respectively are a series of plates 24 and 24*a*; 26 and 26*a*; and 28 and 28*a* that are formed of a refractory material. Disposed between the innermost plates 28 and 28*a* is an outer lining 30 and an inner lining 32 that are also formed of a refractory material. Defined by the inner lining 32, refractory plates 28 and 28*a* and end wall 20 is a heating chamber 34 through which elongated heating elements 36 and 38 project. Both the heating elements 36 and 38 are of cylindrical form and are electrically interconnected to a source of power that supplies current to the heating elements for heating them to a required temperature. The heating elements 36 and 38 may be formed of any suitable material, although it is contemplated that these elements will be formed of a sillicon carbide. In order to mount the heating elements 36 and 38 within the heating chamber 34, both heating elements project through openings formed in the refractory plates 24, 24*a*; 26, 26*a* and 28, 28*a* and are sealed in the openings by any suitable heat resistant packing material.

Projecting through openings also formed in the end walls 22 and 22*a* of the housing 12 and through the heating chamber 34 is an elongated conductor tube 40 that is preferably formed of a material such as quartz. As will be described hereinafter, the quartz conductor tube 40 further extends through the heating unit 14 and defines means for conducting a gaseous medium under pressure from a source exteriorly of the conductor tube for the purpose of transferring impurities into contact with semiconductor wafers that are located within the portion of the conductor tube disposed in the heating chamber 34.

Located within the heating chamber 34 of the housing 12 and positioned in enveloping relation around the conductor tube 40 is a heat storage tube 42. The heat storage tube which may be formed of a special silicon carbide material has a high degree of thermal conductivity and thus provides a means for maintaining the portion of the conductor tube that it envelops at a relatively high temperature and at a constant level. The heat storage tube 42 is directly heated by the adjacent heating elements 36 and 38 and thus conducts the heat absorbed thereby to the conductor tube 40 for maintaining the enveloped portion of the conductor tube at the relatively high temperature levels required. In order to properly support the heat storage tube 42 in position around the conductor tube 40, support members 44 are provided and are received within the inner refractory lining 32 as illustrated in FIG. 2. The support members 44 are formed of the same material from which the heat storage tube is formed and cooperates therewith to maintain a constant high temperature level within the heat storage tube.

As shown in FIG. 1, a thermocouple TC is positioned in contact with the heat storage tube 42 approximately at the midpoint thereof and is electrically interconnected to the control device that controls power input to the heating elements 36 and 38. The thermocouple TC insures that the required temperature of the heat storage tube is maintained, and thus only a single control is utilized for maintaining the temperature in the heat storage tube 42, thereby avoiding the need of a plurality or multi-zone controls therefor.

It is important in the operation of the furnace 10 embodied herein, that the temperature of the heat storage tube 42 be maintained at a constant level throughout the length thereof for the heating cycle. In order to sufficiently heat the end sections of the heat storage tube 42 auxiliary heating elements 46 are provided and are mounted in the end walls 22 and 22*a*. As described hereinabove in connection with the heating elements 36 and 38, the auxiliary heating elements 46 are suitably connected to a source of power that supplies a current thereto for heating the heating elements 46 to the required temperature.

In the operation of the furnace, the required current is introduced to the heating elements 36 and 38 which because of their characteristics are quickly brought to their temperature. The end heating elements 46 are also quickly brought to their required temperature and cooperate with the heating elements 36, 38 to heat the heat storage tube 42. Since the heat storage tube is formed of a material that has a high heat conductivity, it will be brought to the required level and will remain at that level within a tolerance of one-half degree. Because of the unusual conductivity characteristics of the heat storage tube, no special controls are required and the temperature within the tube will remain at the constant level required for the treatment of the workpieces introduced into the conductor tube 40. Further, despite the introduction of the workpieces into the conductor tube, the temperature built up by the heat storage tube will be relatively unaffected and will remain within the established tolerances at the required high level during the heating cycle. In effect, then, the heat storage tube defines a heat sink that is adapted to radiate the required heat for maintaining a constant temperature level within the conductor tube during the heating cycle.

As previously described, the conductor tube 40 extends through a heating unit 14 which is located exteriorly of the housing 12 but is positioned adjacent thereto. The heating unit 14 is relatively simple in construction and includes a top wall 48, a bottom wall 50, end walls 52 and 54 and side walls 56 and 58, suitable openings being formed in the end walls 52 and 54 for receiving the conductor tube 40 therein. Heating elements 60 and 62 project through openings in the end wall 54, and are adapted to supply the necessary heat for adequately heating the portion of the conductor tube 40 that extends through the heating unit 14. As shown in FIG. 1, the portion of the conductor tube 40 that is located outside of the heating unit 14 and adjacent to the end wall 54 is reduced in cross section, and although not shown, this portion of the conductor tube indicated at 64 communicates with a source of a gaseous medium. Thus a stream of gas may be directed into the conductor tube 40 and is exhausted therefrom as indicated by the arrow located at the right hand side of the conductor tube 40 in FIG. 1.

It is also contemplated to utilize a vacuum for drawing the gases through the conductor tube 40, and for this purpose a vacuum pump may be connected into the system for communication with the exhaust end of the conductor tube 40.

One of the objects of the high temperature furnace embodied in the present invention is to process semi-conductor wafers by moving impurities into contact with the wafers as they are subjected to a predetermined temperature. As illustrated in FIG. 1, a plurality of wafers indicated at 66 are located in a tray 68 that is mounted within that portion of the conductor tube 40 that is enveloped by the heat storage tube 42. Located within that portion of the conductor tube 40 that is disposed within the heating unit 14 is a source of impurities, such as boron, indicated at 68*a*. By heating the source 68, and passing a gaseous medium thereover, the impurities that are vaporized are conducted by the gaseous medium through the conductor tube 40 and into contact with the wafers 66. As the impurities resulting from heating of the source 68 contact the wafers 66, the impurity atoms are caused to gradually move through the lattice of the semi-conductor wafers while the wafers remain in a solid state. The rate of diffusion of the impurity atoms in the wafers is dependent upon time of the operating cycle and the temperature produced within the conductor tube 40 by the heat storage tube 42, and thus this diffusion rate may be controlled by heating the heat storage tube 42 within the required range. A uniformity of diffusion may be obtained by heating the wafers through the heat storage tube 42 at the predetermined temperature and continuing the heating cycle for a predetermined period of time. It is understood that after the heating cycle and process is completed, the wafers 66 may be cut into sections as required to form a plurality of semi-conductors.

While there is shown and described herein certain specific structure embodying the invention, it will be manifest to those skilled in the art that various modifications and arrangements of the parts may be made without departing from the spirit and scope of the underlying inventive concept, and that the same is not limited to the particular forms herein shown and described, except, insofar as indicated by the scope of the appended claims.

What is claimed is:

1. In a high temperature furnace, a housing having a heating chamber located therein, an elongated conductor tube formed of a quartz material extending through said heating chamber and receiving articles for heat treatment in a confined area therein, a heat storage tube located generally central in said heating chamber and disposed in enveloping coaxial relation around only a portion of said conductor tube so as to be substantially spaced from the ends of said heating chamber to define a confined heat control zone at the enveloped portion of said conductor tube, wherein said enveloped conductor tube portion and the articles located therein are maintained at a predetermined temperature, a plurality of elongated heating elements projecting through said heating chamber in spaced relation from said conductor tube for supplying the required heat for heating said heat storage to the predetermined temperature, and auxiliary heating elements located in said heating chamber adjacent to the ends of said heat storage tube and cooperating with said elongated heating elements to heat said storage tube to a required temperature level.

2. In a high temperature furnace as set forth in claim 1, wherein the articles to be heat treated are semiconductor wafers, a heating unit located externally of said housing and receiving said conductor tube therein, a source of gaseous impurities located within the portion of said conductor tube that extends through said heating unit, said conductor tube communicating with a source of gaseous medium under pressure, said gaseous medium being conducted through said conductor tube into contact with said source of gaseous impurities, whereby vaporized impurities generated in said conductor tube are transferred therethrough into contact with the wafers located in the heat control zone.

References Cited

UNITED STATES PATENTS

| | | | |
|---|---|---|---|
| 1,496,036 | 6/1924 | Tone. | |
| 2,634,969 | 4/1953 | Hansgirg | 13—25 X |
| 2,692,839 | 10/1954 | Christensen et al. | 118—48 X |
| 3,066,052 | 11/1962 | Howard | 148—189 |
| 3,131,098 | 4/1964 | Krsek et al. | |

MORRIS KAPLAN, *Primary Examiner.*